US012617045B2

(12) United States Patent
Bae

(10) Patent No.: US 12,617,045 B2
(45) Date of Patent: May 5, 2026

(54) GAS-SHIELDED ARC WELDING WIRE AND WELDING MEMBER HAVING EXCELLENT FATIGUE RESISTANCE CHARACTERISTICS AND RESISTANCE TO DEFORMATION DUE TO RESIDUAL STRESS IN WELD ZONE, AND METHOD FOR MANUFACTURING SAME

(71) Applicant: POSCO Co., Ltd, Pohang-si (KR)

(72) Inventor: Gyu-Yeol Bae, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 324 days.

(21) Appl. No.: 18/031,821

(22) PCT Filed: Dec. 20, 2021

(86) PCT No.: PCT/KR2021/019365
§ 371 (c)(1),
(2) Date: Apr. 13, 2023

(87) PCT Pub. No.: WO2023/042974
PCT Pub. Date: Mar. 23, 2023

(65) Prior Publication Data
US 2023/0390873 A1      Dec. 7, 2023

(30) Foreign Application Priority Data

Sep. 16, 2021    (KR) ........................ 10-2021-0123734

(51) Int. Cl.
B23K 35/30        (2006.01)
B23K 9/16         (2006.01)
B23K 35/02        (2006.01)
(52) U.S. Cl.
CPC ............ B23K 35/3086 (2013.01); B23K 9/16 (2013.01); B23K 35/0261 (2013.01)

(58) Field of Classification Search
CPC   B23K 35/02; B23K 35/0261; B23K 35/0266; B23K 35/30; B23K 35/3053;
(Continued)

(56) References Cited

U.S. PATENT DOCUMENTS 8,114,227 B2      2/2012  Corquillet et al.
8,765,269 B2 *    7/2014  Shimamura ............ B23K 35/30
                                                     420/105
(Continued)

FOREIGN PATENT DOCUMENTS

CN          103659016 A  *  3/2014  ............. B23K 9/042
CN          105880871 A  *  8/2016  ............... B23K 9/16
(Continued)

OTHER PUBLICATIONS

Machine translation of CN-103659016: Okamura, Method for manufacturing a journal portion of a turbine rotor made of 9-12% Cr steel and a journal portion manufactured by the method, 2014 (Year: 2014).*

(Continued)

*Primary Examiner* — Vy T Nguyen
*Assistant Examiner* — Abigail H Rhue
(74) *Attorney, Agent, or Firm* — Morgan Lewis & Bockius LLP

(57)          ABSTRACT

An aspect of the present disclosure is to provide a gas shielded arc welding wire capable of imparting excellent fatigue resistance characteristics and resistance to deformation due to residual stress to a weld zone. Another aspect of the present disclosure is to provide a welding member having excellent fatigue resistance characteristics and resistance to deformation due to residual stress of a weld zone, and a method for manufacturing the same.

14 Claims, 12 Drawing Sheets

(58) Field of Classification Search
CPC ........... B23K 35/3066; B23K 35/3073; B23K
35/3086; B23K 9/16; B23K 9/173
See application file for complete search history.

(56) References Cited

U.S. PATENT DOCUMENTS

| | | | |
|---|---|---|---|
| 10,697,486 B2 * | 6/2020 | Maruyama .............. C22C 38/04 | |
| 2004/0140303 A1 | 7/2004 | Kataoka et al. | |
| 2012/0094121 A1 * | 4/2012 | Uno ..................... B23K 35/302 | |
| | | | 428/389 |
| 2013/0078031 A1 | 3/2013 | Nakamura et al. | |
| 2017/0350434 A1 | 12/2017 | Maruyama et al. | |
| 2017/0369958 A1 | 12/2017 | Kitsuya et al. | |
| 2020/0039006 A1 | 2/2020 | Yashima et al. | |
| 2020/0306896 A1 | 10/2020 | Ikai et al. | |
| 2022/0090224 A1 | 3/2022 | Toyoda et al. | |

FOREIGN PATENT DOCUMENTS

| | | | | |
|---|---|---|---|---|
| CN | 109093286 A | * | 12/2018 | ......... B23K 35/3086 |
| CN | 110948136 A | | 4/2020 | |
| CN | 111448029 A | | 7/2020 | |
| EP | 0698443 A1 | | 2/1996 | |
| EP | 0867520 B1 | | 9/1998 | |
| JP | H08-108281 A | | 4/1996 | |
| JP | H10-137975 A | | 5/1998 | |
| JP | 2002-045963 A | | 2/2002 | |
| JP | 2003-285196 A | | 10/2003 | |
| JP | 2004-230410 A | | 8/2004 | |
| JP | 2006-110581 A | | 4/2006 | |
| JP | 2013220431 A | * | 10/2013 | |
| JP | 2014-004609 A | | 1/2014 | |
| JP | 2014014831 A | * | 1/2014 | |
| JP | 2021-003717 A | | 1/2021 | |
| JP | 2021-003732 A | | 1/2021 | |
| JP | 6822611 B2 | | 1/2021 | |
| KR | 10-2003-0093330 A | | 12/2003 | |
| KR | 10-2006-0107380 A | | 10/2006 | |
| KR | 10-2012-0099534 A | | 9/2012 | |
| KR | 10-2013-0017102 A | | 2/2013 | |
| KR | 10-2017-0068531 A | | 6/2017 | |
| KR | 10-2017-0095307 A | | 8/2017 | |
| KR | 10-2020-0079541 A | | 7/2020 | |
| WO | 2021/125280 A1 | | 6/2021 | |

OTHER PUBLICATIONS

Machine translation of CN-105880871: Song, A gas-shielded high-toughness solid welding wire and its use method and application, 2016 (Year: 2016).*

Machine translation of CN-109093286: Fan, A welding wire and flux for AC submerged arc welding of 2.25Cr-1Mo steel, 2018 (Year: 2018).*

Machine translation of JP-2013220431: Murakami, Welded joint excellent in fatigue strength, mag welding method for hot rolled steel sheet, mig welding method for hot rolled steel sheet, and flux-cored wire, 2013 (Year: 2013).*

Machine translation of JP-2014014831: Nakanishi, Method for improving fatigue strength of weld zone and welded joint, 2014 (Year: 2014).*

Korean Office Action dated May 23, 2024 issued in Korean Patent Application No. 10-2021-0123734 (with English translation).

Notice of Allowance dated Jan. 23, 2025, issued in corresponding Korean Patent Application No. 10-2021-0123734.

International Search Report dated Jun. 8, 2022, issued in International Patent Application No. PCT/KR2021/019365 (with English translation).

Extended European Search Report dated May 14, 2025 issued in corresponding European Patent Application No. 21957640.2.

Office Action dated May 17, 2025 issued in corresponding Chinese Patent Application No. 202180073600.9 with the English translation. (Note: CN 103659016 A, CN 105880871 A, CN 109093286 A, and JP H10-137975 A cited previously.).

Indian First Examination Report dated Feb. 9, 2026 issued in Indian Patent Application No. 202317030462 (with English translation).

* cited by examiner

GAS-SHIELDED ARC WELDING WIRE AND WELDING MEMBER HAVING EXCELLENT FATIGUE RESISTANCE CHARACTERISTICS AND RESISTANCE TO DEFORMATION DUE TO RESIDUAL STRESS IN WELD ZONE, AND METHOD FOR MANUFACTURING SAME

CROSS-REFERENCE OF RELATED APPLICATIONS

This application is the U.S. National Phase under 35 U.S.C. § 371 of International Patent Application No. PCT/KR2021/019365, filed on Dec. 20, 2021, which in turn claims the benefit of Korean Application No. 10-2020-0123734, filed on Sep. 16, 2021, the entire disclosures of which applications are incorporated by reference herein.

TECHNICAL FIELD

The present disclosure relates to a gas-shielded arc welding wire, a welding member having excellent fatigue resistance characteristics and resistance to deformation due to residual stress in a weld zone, and a method for manufacturing the same.

BACKGROUND ART

In the automotive field, research into light-weight technology for car bodies and parts is emerging as a major issue due to fuel economy regulation policies for environmental protection, such as to mitigate the effects of global warming. Chassis parts, which are important for vehicle driving performance, also require the application of high-strength steel for weight reduction in accordance with this principle. In order to achieve weight reduction of parts, it is essential to increase the strength of the material, and it is an important factor to guarantee durability of parts formed of high-strength steel in an environment in which repeated fatigue loads are applied. In the case of arc welding, which is mainly used to secure strength when assembling automobile chassis parts, since overlap joint welding is performed between parts by welding of a welding wire, it is unavoidable to provide a geometric shape of a joint portion. This acts as a repetitive fatigue stress concentration portion (notch effect) and becomes a fracture point, resulting in a decrease in the durability of the part, so that there is a limitation in which an advantage of applying high-strength steel is lost. It has been reported that, mainly reducing an angle (toe angle) of an end portion of a bead, which is a main stress concentration portion, is most important factor in the fatigue characteristics of the weld zone, and has no direct correlation with softening of a heat affected zone (HAZ) due to heat input from welding.

According to Patent Document 1, in order to improve fatigue characteristics of an arc weld zone manufactured using a steel having a plate thickness of 5 mm or less and tensile strength of 780 MPa or more, a concept of material control for each position of a temperature section of a weld bead toe portion, that is, the heat affected zone (HAZ) (For example, the position of minimum hardness at a depth of 0.1 mm from a surface thereof must be at least 0.3 mm away from a melting line), was proposed, but there is a limitation that Patent Document 1 fails to disclose a technology to improve the strength of welding metal and control stress characteristics of the weld zone through the improvement of properties of a welding material.

In Patent Document 2, it is suggested that the fatigue characteristics may be improved by applying a compressive stress by continuously hitting an end portion of a weld bead with a chipper (beating pin) to form a plastic deformation region. In Patent Document 3, in order to reduce a toe angle of arc weld bead between a sub-frame and a bracket, which are chassis parts for automobiles, a re-melting treatment method of the end portion of the weld bead through a plasma heat source after welding was proposed. However, the proposed methods have a problem in that a process cost increases when manufacturing parts because a post-welding process is added.

Meanwhile, in general, in the case of a thin steel sheet having tensile strength of 950 MPa or more, deformation due to tensile residual stress occurs after arc welding for manufacturing chassis parts, which not only deteriorates assembly properties, but also reduces the fatigue characteristics of a weld zone due to the tensile residual stress of the weld zone.

PRIOR ART DOCUMENT (Patent Document 1) Japanese Patent Laid-Open No. 2013-220431

(Patent Document 2) Japanese Patent Laid-Open No. 2014-014831

(Patent Document 3) Japanese Patent Laid-Open No. 2014-004609

SUMMARY OF INVENTION

Technical Problem

An aspect of the present disclosure is to provide a gas shielded arc welding wire capable of imparting excellent fatigue resistance characteristics and resistance to deformation due to residual stress to a weld zone.

Another aspect of the present disclosure is to provide a welding member having excellent fatigue resistance characteristics and resistance to deformation due to residual stress of a weld zone, and a method for manufacturing the same.

Solution to Problem

According to an aspect of the present disclosure, a gas-shielded arc welding wire having excellent fatigue resistance characteristics and resistance to deformation due to residual stress in a weld zone is provided, the gas-shielded arc welding wire including, by weight %, 0.06 to 0.16% of C, 0.001 to 0.2% of Si, 1.6 to 1.9% of Mn, 1.2 to 6.0% of Cr, 0.4 to 0.65% of Mo, 0.015% or less (excluding 0%) of P, 0.01% or less (excluding 0%) of S, 0.20% or less (excluding 0%) of Al, and a remainder of Fe and other unavoidable impurities, wherein a value in Equation 1 below is 300 to 500, $$732-202\times C+216\times Si-85\times Mn-37\times Ni-47\times Cr-39\times Mo \quad \text{[Equation 1]}$$

where, a content of each element in [Equation 1] above is in wt %.

According to another aspect of the present disclosure, a welding member including a base material and a weld zone is provided, the welding member having excellent fatigue resistance characteristics and resistance to deformation due to residual stress in a weld zone, wherein the weld zone includes, by weight %, 0.05 to 0.16% of C, 0.001 to 1.0 of Si, 1.4 to 2.5% of Mn, 0.4 to 5.0% of Cr, 0.1 to 1.5% of Mo, 0.015% or less (excluding 0%) of P, 0.01% or less (excluding 0%) of S, 0.20% or less (excluding 0%) of Al, and a remainder of Fe and other unavoidable impurities, wherein the weld zone has a microstructure including bainite; acicular ferrite; and at least one of granular ferrite, martensite and retained austenite; wherein the microstructure has an average effective grain size of 10 μm or less, and a ratio of high angle grain boundaries with a misorientation angle between grain boundaries of 55° or more respective to total grain boundaries is 40% or more, and a value of R expressed by Equation 2 below is 10.5 to 18.5, $$R = (K/G) \times (Q/T) \qquad \text{[Equation 2]}$$

where, in [Equation 2], K is a ratio of grain boundaries with a misorientation angle of 55° or more relative to the total grain boundaries of a weld zone (%), G is an average effective grain size of the weld zone (μm), T is a thickness of a base material (mm), Q is a welding heat input (kJ/cm), where Q is defined by [Equation 3] below, $$Q = (I \times E) \times 0.048/\upsilon \qquad \text{[Equation 3]}$$

where, in [Equation 3], I is a welding current (A), E is a welding voltage (V), and υ is a welding speed (cm/min).

According to another aspect of the present disclosure, a method for manufacturing a welding member is provided, wherein the method for manufacturing a welding member is obtained by preparing two or more base materials, and then gas-shielded arc welding using a welding wire, the method for manufacturing a welding member having excellent fatigue resistance characteristics and resistance to deformation due to residual stress of a weld zone, wherein the welding wire includes, by weight %, 0.06 to 0.16% of C, 0.001 to 0.2% of Si, 1.6 to 1.9% of Mn, 1.2 to 6.0% of Cr, 0.4 to 0.65% of Mo, 0.015% or less (excluding 0%) of P, 0.01% or less (excluding 0%) of S, 0.20% or less (excluding 0%) of Al, and a remainder of Fe and other unavoidable impurities, wherein a value of Equation 1 below is 300 to 500, wherein, during the gas-shielded arc welding, a value of Equation 4 below is 1.2 to 1.6, $$732 - 202 \times C + 216 \times Si - 85 \times Mn - 37 \times Ni - 47 \times Cr - 39 \times Mo \qquad \text{[Equation 1]}$$

where, in [Equation 1] above, a content of each element is in wt %

$$Q/T \qquad \text{[Equation 4]}$$

where, in [Equation 4] above, T is a thickness of a base material (mm) and Q is a welding heat input (kJ/cm).

Advantageous Effects of Invention

According to an aspect of the present disclosure, a gas-shielded arc welding wire capable of imparting excellent fatigue resistance characteristics and resistance to deformation due to residual stress to a weld zone may be provided.

According to another aspect of the present disclosure, a welding member having excellent fatigue resistance characteristics and resistance to deformation due to residual stress in a weld zone, and a method for manufacturing the same, may be provided.

BEST MODE FOR INVENTION

Figure 1:
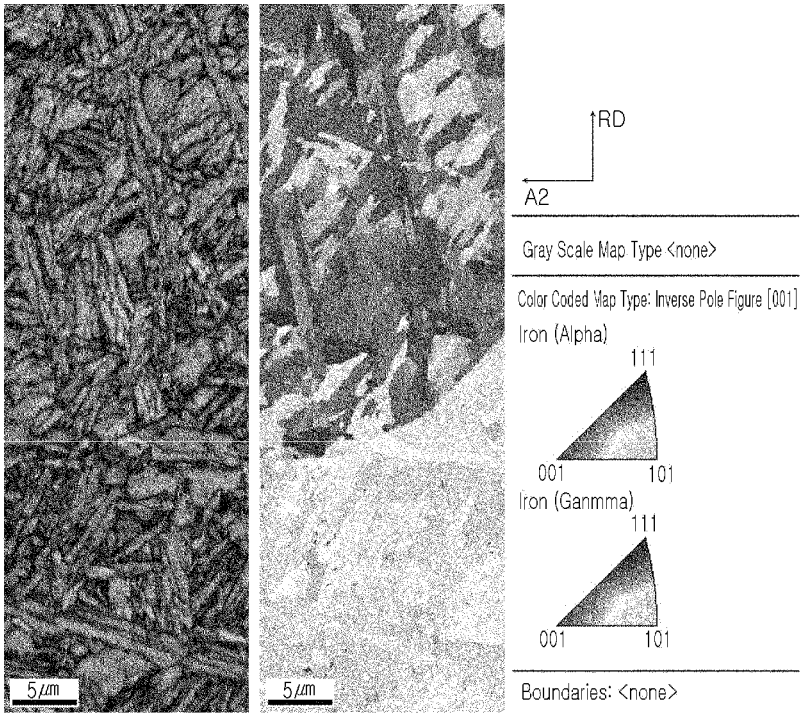
FIG. 1 is an image quality (IQ) and inverse pole figure (IPF) photograph of Inventive Example 1 according to an embodiment of the present disclosure observed with EBSD.

Hereinafter, a gas-shielded arc welding wire according to an embodiment of the present disclosure will be described. A content of an alloy composition described below is in wt %.

Carbon (C): 0.06 to 0.16%

Carbon (C) is beneficial for an action of stabilizing arc to atomize a volume, and is also a beneficial element for securing hardenability. When a content of C is less than 0.06%, the volume becomes coarse and the arc becomes unstable, and an amount of spatter generation increases, and it may be difficult to secure sufficient strength of a welding metal, which may be disadvantageous. On the other hand, when the content of C exceeds 0.16%, there may be a disadvantage in that viscosity of molten metal is lowered, resulting in a poor bead shape, as well as excessive hardening of the welding metal, thereby reducing toughness. A lower limit of the content of C is more preferably 0.062%, is even more preferably 0.065%, and is most preferably 0.07%. An upper limit of the content of C is more preferably 0.12%, is even more preferably 0.10%, and is most preferably 0.09%.

Silicon (Si): 0.001 to 0.2%

Silicon (Si) is an element (a deoxidation element) promoting deoxidation of molten metal during arc welding, and is effective in suppressing the occurrence of blowholes. When a content of Si is less than 0.001%, there may be a disadvantage in that deoxidation becomes insufficient and blowholes are likely to be generated, and when the content of Si exceeds 0.2%, there may be a disadvantage in that non-conductive slag is generated excessively, paint defects in a weld zone are caused and penetrability of molten metal is lowered due to a lack of surface activation of the welded portion due to excessive deoxidation. A lower limit of the content of Si is more preferably 0.01%, is even more preferably 0.02%, and is most preferably 0.04%. An upper limit of the content of Si is more preferably 0.15%, is even more preferably 0.10%, and is most preferably 0.08%.

Manganese (Mn): 1.6 to 1.9%

Manganese (Mn) is a deoxidizing element and is an element for promoting deoxidation of molten metal during arc welding and suppressing generation of blowholes. When a content of Mn is less than 1.6%, there may be a disadvantage in that deoxidation becomes insufficient and blowholes are likely to be generated. When the content of Mn exceeds 1.9%, there may be a disadvantage in that viscosity of molten metal becomes excessively high, and when a welding speed is high, the molten metal cannot properly flow into a welded site, resulting in a humped bead, which is likely to cause a poor bead shape. A lower limit of the content of Mn is more preferably 1.65%, is even more preferably 1.7%, and is most preferably 1.75%. An upper limit of the content of Mn is more preferably 1.87%, is even more preferably 1.85%, and is most preferably 1.8%.

Chromium (Cr): 1.2 to 6.0%

Cr is a ferrite stabilizing element, and is an element advantageous for securing hardenability to improve strength of welding metal. When a content of Cr is less than 1.2%, there may be a disadvantage in that it is difficult to secure sufficient strength of the welding metal, and when the content of Cr exceeds 6.0%, there may be a disadvantage in that brittleness of the welding metal is unnecessarily increased in some cases, making it difficult to sufficient toughness. A lower limit of the content of Cr is more preferably 1.25%, is even more preferably 1.30%, and is most preferably 1.35%. An upper limit of the content of Cr is more preferably 5.8%, is even more preferably 5.5%, and is most preferably 5.2%.

Molybdenum (Mo): 0.4 to 0.65%

Molybdenum (Mo) is a ferrite stabilizing element, and is an element advantageous for securing hardenability to improve strength of welding metal. When a content of Mo is less than 0.4%, there may be a disadvantage in that it is difficult to secure sufficient strength of welding metal, and when the content of Mo exceeds 0.65%, there may be a disadvantage in that toughness of the welding metal is lowered in some cases. A lower limit of the content of Mo is more preferably 0.42%, is even more preferably 0.44%, and is most preferably 0.46%. An upper limit of the content of Mo is more preferably 0.62%, is even more preferably 0.60%, and is most preferably 0.58%.

Phosphorus (P): 0.015% or Less (Excluding 0%)

Phosphorus (P) is an element that is generally incorporated as an unavoidable impurity in steel, and is also an element included as a normal impurity in a solid wire for arc welding. When a content of P exceeds 0.015%, there may be a disadvantage in that high-temperature cracking of welding metal becomes remarkable. The content of P is more preferably 0.014% or less, is even more preferably 0.012% or less, and is most preferably 0.01% or less.

Sulfur (S): 0.01% or Less (Excluding 0%)

Sulfur (S) is also generally incorporated as an unavoidable impurity in steel, and is also an element included as a normal impurity in a solid wire for arc welding. When a content of S exceeds 0.01%, toughness of welding metal deteriorates in some cases, and surface tension of molten metal is insufficient during welding, so that there may be a disadvantage in which a molten portion flows downwardly excessively due to gravity during high-speed vertical welding, resulting in a poor shape of the weld bead. The content of S is more preferably 0.008% or less, is even more preferably 0.006% or less, and is most preferably 0.005% or less.

Aluminum (Al): 0.20% or Less (Excluding 0%)

Aluminum (Al) is a deoxidizing element and is an element capable of promoting deoxidation of molten metal during arc welding and improving strength of welding metal even in a small amount. When a content of Al exceeds 0.20%, generation of Al-based oxides increase, so that there may be a disadvantage in that strength and toughness of the welding metal are deteriorated in some cases, and electrode-position paint defects of a weld zone become sensitive due to non-conductive oxides. The content of Al is more preferably 0.15% or less, is even more preferably 0.12% or less, and is most preferably 0.10% or less.

A remainder of the present disclosure may be iron (Fe). However, in a general manufacturing process, inevitable impurities may be added from raw materials or an ambient environment, and thus, impurities may not be excluded. A person skilled in the art of a general manufacturing process may be aware of the impurities, and thus, the descriptions of the impurities may not be provided in the present disclosure.

In addition to the alloy composition described above, the wire of the present disclosure may further include at least one of 0.40% or less of Ni and 0.50% or less of Cu.

Nickel (Ni): 0.40% or Less

Nickel (Ni) is an element capable of improving strength and toughness of welding metal. However, when a content of Ni exceeds 0.40%, there may be a disadvantage in that it becomes sensitive to cracks. The content of Ni is more preferably 0.30% or less, is even more preferably 0.20% or less, and is most preferably 0.10% or less.

Copper (Cu): 0.50% or Less

Copper (Cu) is generally contained in about 0.02% as an impurity in steel constituting a wire, and in a solid wire for arc welding, a content of Cu may be determined mainly due to copper plating performed on a surface of the wire. Cu is an element capable of stabilizing feedability and conductivity of the wire. However, when the content of Cu exceeds 0.50%, there may be a disadvantage in that crack susceptibility of the welding metal is increased. The content of Cu is more preferably 0.45% or less, is even more preferably 0.40% or less, and is most preferably 0.30% or less.

Meanwhile, the wire of the present disclosure preferably satisfies the alloy composition described above, and a value of Equation 1 below is preferably 300 to 500. The Equation 1 below is to form a microstructure of a welding metal portion to be a dense structure in which acicular ferrite and bainite are interlocked in a complex form by utilizing transformation of lower bainite including acicular ferrite, and to offset contractile tensile stress generated during solidification of a melting pool using compressive residual stress in the weld zone generated by transformation expansion through lowering a low-temperature transformation initiation temperature, or to add additional compressive stress. When a value of the following Equation 1 is less than 300, hardenability may be excessively increased and a low-temperature transformation structure is excessively developed so that there may be a disadvantage in that toughness of welding metal is insufficient and the low-temperature transformation initiation temperature is too low so that a fraction of retained austenite increases and an effect of decreasing transformation expansion simultaneously. On the other hand, when the value of the following Equation 1 is less than 300, conversely, an effect of lower bainite transformation including acicular ferrite described above may not be sufficiently obtained, so that there may be a disadvantage in that the microstructure of the welding metal may not be formed to be dense and the low-temperature transformation initiation temperature rises, resulting in significantly reducing the effect of offsetting the tensile residual stress of the weld zone as well. A lower limit of the value of the following Equation 1 is more preferably 312, is even more preferably 315, and is most preferably 318. An upper limit of the value of the following Equation 1 is more preferably 498, is even more preferably 496, and is most preferably 494.

$$732-202\times C+216\times Si-85\times Mn-37\times Ni-47\times Cr-39\times Mo \qquad \text{[Equation 1]}$$

where, a content of each element in [Equation 1] is in wt %.

In the present disclosure, a shape or type of a wire is not particularly limited, but, for example, the wire of the present disclosure may be one of a solid wire, a metal-cored wire, and a flux-cored wire.

Hereinafter, a welding member according to an embodiment of the present disclosure will be described. The welding member of the present disclosure includes a base material and a weld zone. Hereinafter, an alloy composition of the weld zone will be described first. A content of the alloy composition described below is in wt %. A lower limit of the content of Mn is more preferably 1.45%, is even more preferably 1.50%, and is most preferably 1.55%. An upper limit of the content of Mn is more preferably 2.47%, is even more preferably 2.45%, and is most preferably 2.43%.

Carbon (C): 0.05 to 0.16%

Carbon (C) is a major element capable of lowering a temperature at which transformation of acicular ferrite, bainite, and martensite is initiated through diffusionless transformation according to continuous cooling in a high-temperature austenite phase in a solidification process of welding metal. When a content of C is less than 0.05%, hardenability decreases, making it difficult to secure sufficient strength of the welding metal, and according to the above-described principle, the low-temperature transformation initiation temperature is not sufficiently lowered, so there may be a disadvantage in that an effect of offsetting tensile residual stress of the weld zone due to a low-temperature transformation expansion effect during a cooling process is significantly reduced, and a grain boundary structure having a high angle having a misorientation angle between grains is not formed. On the other hand, when a content of C exceeds 0.16%, viscosity of molten metal is lowered, resulting in a poor bead shape, as well as excessive hardening of the welding metal to reduce toughness. Here, the low-temperature transformation temperature may be excessively low so that compressive stress due to low-temperature transformation may not be secured at a temperature near room temperature and a retained austenite phase, an untransformed phase may increase in a final welding metal structure. A lower limit of the content of C is more preferably 0.052%, is even more preferably 0.055%, and is most preferably 0.58%. An upper limit of the content of C is more preferably 0.12%, is even more preferably 0.1%, and is most preferably 0.09%.

Silicon (Si): 0.001 to 1.0%

Silicon (Si) is an element (a deoxidation element) promoting deoxidation of molten metal during arc welding, and is effective in suppressing the occurrence of blowholes and increasing a low-temperature transformation initiation temperature. When a content of Si is less than 0.001%, there may be a disadvantage in that deoxidation becomes insufficient and blowholes is likely to be generated, and the low-temperature transformation initiation temperature may be excessively lowered, thereby reducing an effect of offsetting tensile residual stress of the weld zone. On the other hand, when the content of Si exceeds 1.0%, there may be a disadvantage in that non-conductive slag is generated excessively, paint defects in a weld zone are caused, and penetrability of molten metal is lowered due to a lack of surface activation of the weld zone due to excessive deoxidation and the low-temperature transformation initiation temperature may increase so that a sufficient compressive stress effect due to low-temperature transformation is not be obtained. A lower limit of the content of Si is more preferably 0.01%, is even more preferably 0.02%, and is most preferably 0.04%. An upper limit of the content of Si is more preferably 0.85%, is even more preferably 0.75%, and is most preferably 0.65%.

Manganese (Mn): 1.4 to 2.5%

Manganese (Mn) is a deoxidizing element and is an element of promoting deoxidation of molten metal during arc welding to suppress occurrence of blowholes, and is an element of reducing a low-temperature transformation initiation temperature such as C. When a content of Mn is less than 1.4%, deoxidation becomes insufficient and blowholes are likely to be generated and a low-temperature transformation initiation temperature is increased so that there may be a disadvantage in that it is not possible to obtain a sufficient compressive stress effect according to low-temperature transformation. On the other hand, when the content of Mn exceeds 2.5%, viscosity of welding metal becomes excessively high, and a welding speed thereof is high, molten metal cannot properly flow into a welded site, so that there may be a disadvantage in that a poor bead shape is likely to be generated as a humped bead is formed, and the low-temperature transformation initiation temperature is too low so that an effect of offsetting tensile residual stress in the weld zone decreases. A lower limit of the content of Mn is more preferably 1.45%, is even more preferably 1.50%, and is most preferably 1.55%. An upper limit of the content of Si is more preferably 2.47%, is even more preferably 2.45%, and is most preferably 2.43%.

Chromium (Cr): 0.4 to 5.0%

Chromium (Cr) is a ferrite stabilizing element, and an element for lowering a low-temperature transformation initiation temperature, and is an element advantageous for improving strength by securing hardenability of the welding metal. When a content of Cr is less than 0.4%, a ratio of high angle grain boundaries is reduced and it may be difficult to sufficiently obtain a compressive stress effect, and it may be difficult to secure sufficient strength in welding metal. On the other hand, when the content of Cr exceeds 5.0%, brittleness of the welding metal is unnecessarily increased in some cases, so that it may be difficult to secure sufficient toughness, and the low-temperature transformation initiation temperature may be too low, so that the compressive stress of the weld zone may not be sufficiently secured. A lower limit of the content of Cr is more preferably 0.44%, is even more preferably 0.47%, and is most preferably 0.50%. An upper limit of the content of Cr is more preferably 4.8%, is even more preferably 4.5%, and is most preferably 4.2%.

Molybdenum (Mo): 0.1 to 1.5%

Molybdenum (Mo) is a ferrite stabilizing element, and is an element lowering a low-temperature initiation temperature, and is an element, advantageous for improving strength of welding metal according to securing hardenability of the welding metal. When a content of Mo is less than 0.1%, a ratio of high angle grain boundaries of welding metal is reduced and it is difficult to sufficiently obtain a compressive stress effect according to low-temperature transformation and it may be difficult to secure sufficient strength of the welding metal. On the other hand, when the content of Mo exceeds 1.5%, toughness of the welding metal is lowered in some cases, and the low-temperature transformation initiation temperature may be too low, so that the compressive stress of the weld zone may not be sufficiently secured. A lower limit of the content of Mo is more preferably 0.16%, is even more preferably 0.18%, and is most preferably 0.2%. An upper limit of the content of Mo is more preferably 1.48%, is even more preferably 1.46%, and is most preferably 1.44%.

Phosphorus (P): 0.015% or Less (Excluding 0%)

Phosphorus (P) is an element that is generally incorporated as an unavoidable impurity in steel. When a content of P exceeds 0.015%, there may be a disadvantage in that high-temperature cracking of welding metal becomes remarkable. The content of P is more preferably 0.014% or less, is even more preferably 0.012% or less, and is most preferably 0.01% or less.

Sulfur (S): 0.01% or Less (Excluding 0%)

Sulfur (S) is also generally incorporated as an unavoidable impurity in steel. When a content of S exceeds 0.01%, toughness of welding metal deteriorates in some cases, and surface tension of molten metal is insufficient during welding, so that there may be a disadvantage in which a molten portion flows downwardly excessively due to gravity during high-speed vertical welding (welding from top to bottom during vertical welding), resulting in a poor shape of the weld bead. The content of S is more preferably 0.008% or less, is even more preferably 0.006% or less, and is most preferably 0.005% or less.

Aluminum (Al): 0.20% or Less (Excluding 0%)

Aluminum (Al) is a deoxidizing element and is an element capable of promoting deoxidation of molten metal during arc welding and improving strength of welding metal even in a small amount. When a content of Al exceeds 0.20%, generation of Al-based oxides increase, there may be a disadvantage in that strength and toughness of the welding metal are deteriorated in some cases, and electrodeposition paint defects of a weld zone become sensitive due to non-conductive oxides. The content of Al is more preferably 0.15% or less, is even more preferably 0.12% or less, and is most preferably 0.10% or less.

A remainder of the present disclosure may be iron (Fe). However, in a general manufacturing process, inevitable impurities may be added from raw materials or an ambient environment, and thus, impurities may not be excluded. A person skilled in the art of a general manufacturing process will be aware of such impurities, and thus, the descriptions of the impurities may not be provided in the present disclosure.

In addition to the alloy composition described above, the welding member of the present disclosure may further include at least one of 0.40% or less of Ni and 0.50% or less of Cu.

Nickel (Ni): 0.40% or Less

Nickel (Ni) is an element capable of improving strength and toughness of welding metal. However, when a content of Ni exceeds 0.40%, there may be a disadvantage in that it becomes sensitive to cracks. The content of Ni is more preferably 0.30% or less, is even more preferably 0.20% or less, and is most preferably 0.10% or less.

Copper (Cu): 0.50% or Less

Copper (Cu) is an effective element for improving strength of welding metal. However, when a content of Cu exceeds 0.50%, there may be a disadvantage in that crack susceptibility of the welding metal is increased. The content of Cu is more preferably 0.45% or less, is even more preferably 0.40% or less, and is most preferably 0.30% or less. Meanwhile, in order to sufficiently obtain an effect of improving strength, Cu may be contained in the welding metal in an amount of 0.01% or more.

Meanwhile, it is preferable that the weld zone of the welding member of the present disclosure includes a microstructure including bainite; acicular ferrite; and at least one of granular ferrite, martensite and retained austenite. In the present disclosure, in particular, by appropriately controlling a value of Equation 1 as described above, a microstructure of a welding metal portion is formed as a structure in which acicular ferrite and bainite are interlocked in complex form, that is a structure in which a misorientation angle between grains has a high angle, by utilizing lower bainite transformation including acicular ferrite within od austenite grains that occurs during a cooling process after welding, and by lowering a low-temperature transformation initiation temperature, it is possible to obtain an effect of offsetting contractile tensile stress generated during solidification during melting or adding additional compressive stress with compressive residual stress of a weld zone that occurs through low-temperature transformation expansion.

In this case, the microstructure of the weld zone preferably has an average effective grain size of 10 μm or less. As described above, by finely controlling the average effective grain size, it is possible to obtain an effect of securing relatively excellent strength and toughness of welding metal. When the average effective grain size exceeds 10 μm, it is difficult to simultaneously secure sufficient strength and toughness of welding metal as described above. The average effective grain size is more preferably 7 μm or less, even more preferably 5 μm or less, and most preferably 4 μm or less. Meanwhile, the average effective grain size may be defined as an average size of grains converted from the number of grains per unit area.

In addition, in the microstructure of the weld zone, it is preferable that a ratio of a high angle grain boundary in which a misorientation angle between grains is 55° or more relative to the total grain boundaries is 40% or more. By controlling the ratio of high angle grain boundaries as described above, sufficient strength and toughness of the welding metal may be simultaneously secured through formation of a very dense and complex microstructure, and, in particular, a low-temperature transformation expansion effect that can sufficiently offset tensile residual stress of a weld zone of a thin steel sheet having tensile strength of 950 MPa or higher may be obtained. However, when a ratio of the high angle grain boundary is less than 40%, there is a disadvantage in that the above-described characteristics are insufficient. The ratio of the high angle grain boundary is more preferably 44% or more, even more preferably 47% or more, and most preferably 50% or more.

In addition, it is preferable that the weld zone has a value of R of 10.5 to 18.5 expressed by the following Equation 2. Equation 2 below is to increase a misorientation angle between grains realized according to the effect of Equation 1 above, and effective grains constituting the same are fine-grained to form a more dense and complex microstructure. When the value of Equation 2 below is less than 10.5, there may be a disadvantage in that the strength and toughness of welding metal may not be sufficiently secured, and when the value thereof exceeds 18.5, brittleness of the welding metal becomes too high so that there may be a disadvantage of being sensitive to cracking. A lower limit of the value of the following Equation 2 is preferably 10.6, even more preferably 10.8, and most preferably 11. An upper limit of the value of the following Equation 2 is preferably 18.4, even more preferably 18.2, and most preferably 18. Meanwhile, in the Equation 2 below, a misorientation angle between grains may consider a series of lattice arrangement constituting grains as one grain and in this case, the angle may be defined as an angle formed by each grain boundary.

$$R=(K/G)\times(Q/T) \qquad \text{[Equation 2]}$$

where, in [Equation 2], K is a ratio of a grain boundary having a misorientation angle of 55° or more relative to the total grain boundaries in a weld zone (%), G is an average effective grain size of the weld zone (μm), T is a thickness of a base material (mm), and Q is a welding heat input (kJ/cm), and Q is defined by the following [Equation 3].

$$Q=(I\times E)\times0.048/\upsilon \qquad \text{[Equation 3]}$$

where, in [Equation 3], I refers to a welding current (A), E refers to a welding voltage (V), and υ refers to a welding speed (cm/min).

A weld zone of the present disclosure provided as described above may have fatigue strength of 140 MPa or more. In addition, the weld zone may have compressive residual stress of 90 MPa or more in a region within 5 mm in a direction perpendicular to the base material from an end portion of a weld bead. Meanwhile, the types of the residual stress may include tensile residual stress and compressive residual stress, and in the case of tensile residual stress, in particular, a problem of deterioration of fatigue resistance characteristics of the weld zone may occur. Accordingly, in the present disclosure, an appropriate level of compressive residual stress is applied to the weld zone. As described above, the welding member of the present disclosure may have excellent fatigue resistance characteristics and resistance to deformation due to residual stress of the weld zone, so that it is possible to effectively improve durability and assemblability of a product when applied to automobile parts.

Meanwhile, in the present disclosure, an alloy composition of the base material is not particularly limited. However, as an example, the base material may include, by wt %, 0.05 to 0.13% of C, 0.2 to 2.0% of Si, 1.3 to 3.0% of Mn, 0.01 to 2.0% of Cr, 0.01 to 2.0% of Mo, 0.01 to 0.1% of Al, 0.001 to 0.05% of P, 0.001 to 0.05% of S, and a remainder of Fe and other unavoidable impurities. In addition, the base material may further include at least one of 0.01 to 0.2% of Ti and 0.01 to 0.1% of Nb. In addition, the base material may have a thickness of 0.8 to 4.0 mm.

In addition, in the present disclosure, there is no particular limitation on a method for manufacturing a welding member. However, one of the advantageous methods for manufacturing the welding member of the present disclosure will be described as follows.

First, after preparing two or more base materials, in manufacturing a welding member by gas-shielded arc welding using a welding wire, the welding wire preferably satisfies the above-described alloy composition and a value of Equation 1. In addition, the base material may also have the above-described alloy composition. In addition, during the gas shielded arc welding, a value of the following Equation 4 is preferably 1.2 to 1.6. When the value of Equation 4 below is less than 1.2, hardenability of welding metal and a coarse grained heat affected zone is excessively increased, so that there may be a disadvantage that strength and toughness are insufficient, and when the value thereof exceeds 1.6, there may be disadvantages in that not only insufficient strength of welding metal and a decrease in strength of the welding heat-affected zone become too excessive, but also back bead and melting easily occur in the weld zone, resulting in defects. A lower limit of a value of the following Equation 4 is more preferably 1.24, even more preferably 1.26, and most preferably 1.28. An upper limit of a value of the following Equation 1 is more preferably 1.58, even more preferably 1.56, and most preferably 1.54.

$$Q/T \qquad \text{[Equation 4]}$$

where, in [Equation 4], T is a thickness of a base material (mm), and Q is a welding heat input (kJ/cm).

MODE FOR INVENTION

Hereinafter, the present disclosure will be described in detail through Examples. However, the following Examples are only examples for explaining the present disclosure in more detail, and do not limit the scope of the present disclosure.

EXAMPLE

After preparing two steel sheets having a tensile strength of 980 MPa having an alloy composition disclosed in Table 1 below, and a thickness disclosed in Table 4 below, a welding member having a weld zone having an alloy composition illustrated in Table 3 below was manufactured performing gas-shielded welding while imparting a welding heat input disclosed in the Table 4 below using a solid wire having an alloy composition disclosed in Table 2 below. After measuring a microstructure, fatigue strength, and residual stress of the welded portion manufactured as described above, results thereof are illustrated in Tables 4 to 6 below.

After taking a specimen from a weld zone, a microstructure was observed with an optical microscope by micro-polishing a cross-sectional structure of the specimen and then etching the same with a nital solution. In addition, Kikuchi patterns were analyzed through electron backscattered diffraction (EBSD), so that image quality (IQ) and inverse pole figure (IPF) maps were obtained, visualizing grain boundaries and grain orientation information. Thereafter, the average effective grain size was measured by classifying grain by referring the IQ and IPF map of EBSD along with a microstructure photograph observed with the optical microscope described above, and then calculating an average size of grains converted from the number of grains per unit area.

A ratio of high angle grain boundaries having a misorientation angle between grains of 55° or more relative to the total grain boundaries in the weld zone was considered as one grain, and the angle formed by each grain boundary is regarded as one grain through the EBSD analysis method described above. In this case, after measuring the angle formed by each grain boundary, it was measured by extracting the ratio of grain boundaries having a misorientation angle of 55° or more among the total distribution of misorientation angles between grains.

After taking a specimen from the welded portion of the welding member, fatigue strength was defined as a maximum load satisfying a fatigue life of $2\times10^6$ Cycles by performing a fatigue test. The fatigue test measured the fatigue life (Cycles) using a tensile-tensile high-cycle fatigue test for each load, wherein a ratio of a minimum load and a maximum load was 0.1, a repetitive load frequency was 15 Hz. In addition, the fatigue life corresponding to strength (MPa), converted by dividing a load (kN) by an area according to a width and thickness of each specimen, was derived. In this case, the minimum load refers to a minimum value of a repetitive load having the above-described constant load applied frequency, and the maximum load refers to a maximum value of the repetitive load.

Residual stress was calculated by measuring a change in an amount of stress added by measuring a change in a distance between lattices constituting grains using an X-ray diffraction principle for a region within 5 mm from an end portion of weld bead in the direction perpendicular to the base material. In this case, X-rays were generated from a Cr tube at a voltage of 30 kV and a current of 6.7 mA. Meanwhile, when a value of residual stress was negative (−), it was determined to be compressive residual stress, and when a value of residual stress was positive (+), it was determined to be tensile residual stress. In addition, a bead start portion refers to a weld bead formed by starting welding, a bead end portion means a weld bead formed by finishing welding, and a bead center portion means a weld bead located in a middle of the bead start portion and the bead end portion.

TABLE 1

| Base material No. | Alloy composition (by weight % ) | | | | | | | | | | |
|---|---|---|---|---|---|---|---|---|---|---|---|
| | C | Si | Mn | Cr | Mo | Al | P | S | Ni | Cu | Remainder |
| 1 | 0.070 | 1.100 | 2.10 | 0.90 | 0.01 | 0.025 | 0.009 | 0.001 | 0.02 | 0.02 | Fe |
| 2 | 0.090 | 0.900 | 2.00 | 0.20 | 0.20 | 0.025 | 0.009 | 0.001 | 0.01 | 0.02 | Fe |

TABLE 2

| Wire No. | Alloy composition (by weight %) | | | | | | | | | | | |
|---|---|---|---|---|---|---|---|---|---|---|---|---|
| | C | Si | Mn | Cr | Mo | Al | P | S | Ni | Cu | Remainder | Equation |
| 1 | 0.16 | 0.04 | 1.70 | 4.80 | 0.50 | 0.004 | 0.006 | 0.001 | 0.04 | 0.14 | Fe | 317 |
| 2 | 0.08 | 0.09 | 1.74 | 4.92 | 0.49 | 0.008 | 0.004 | 0.003 | — | 0.30 | Fe | 337 |
| 3 | 0.07 | 0.06 | 1.77 | 1.35 | 0.55 | 0.009 | 0.005 | 0.004 | — | 0.34 | Fe | 495 |
| 4 | 0.07 | 0.37 | 1.65 | 0.50 | 0.30 | 0.006 | 0.011 | 0.006 | 3.00 | 0.25 | Fe | 511 |
| 5 | 0.08 | 0.08 | 1.70 | 0.04 | 0.007 | 0.010 | 0.012 | 0.005 | 0.023 | 0.19 | Fe | 585 |
| 6 | 0.27 | 0.04 | 1.70 | 4.80 | 0.50 | 0.004 | 0.006 | 0.001 | 0.04 | 0.14 | Fe | 295 |

[Equation 1] $732 - 202 \times C + 216 \times Si - 85 \times Mn - 37 \times Ni - 47 \times Cr - 39 \times Mo$

TABLE 3

| Welding member No. | Base material No. | Wire No. | Alloy composition (by weight %) | | | | | | | | | | |
|---|---|---|---|---|---|---|---|---|---|---|---|---|---|
| | | | C | Si | Mn | Cr | Mo | Al | P | S | Ni | Cu | Remainder |
| Inventive Example 1 | 1 | 1 | 0.10 | 0.56 | 1.87 | 2.60 | 0.22 | 0.013 | 0.008 | 0.0013 | 0.038 | 0.08 | Fe |
| Inventive Example 2 | 1 | 2 | 0.08 | 0.51 | 1.82 | 2.43 | 0.21 | 0.017 | 0.011 | 0.0015 | 0.009 | 0.16 | Fe |
| Inventive Example 3 | 2 | 2 | 0.08 | 0.62 | 1.90 | 1.30 | 0.24 | 0.014 | 0.013 | 0.0022 | 0.007 | 0.17 | Fe |
| Inventive Example 4 | 2 | 3 | 0.08 | 0.59 | 1.90 | 0.50 | 0.26 | 0.011 | 0.011 | 0.0028 | 0.006 | 0.18 | Fe |
| Comparative Example 1 | 2 | 4 | 0.08 | 0.63 | 1.80 | 0.32 | 0.21 | 0.008 | 0.015 | 0.0041 | 1.3 | 0.14 | Fe |
| Comparative Example 2 | 2 | 5 | 0.08 | 0.52 | 1.80 | 0.13 | 0.06 | 0.010 | 0.013 | 0.0031 | 0.014 | 0.11 | Fe |
| Comparative Example 3 | 1 | 6 | 0.17 | 0.56 | 1.87 | 2.60 | 0.22 | 0.013 | 0.008 | 0.0013 | 0.038 | 0.08 | Fe |

TABLE 4

| Welding member No. | Thickness of base material (T) (mm) | Heat input (Q) (kJ/cm) | Microstructure | Ratio of high angle grain boundary having a misorientation angle of 55° or more between grains compared to total grain boundaries (K) (%) | Average effective grain size (G) (μm) | R |
|---|---|---|---|---|---|---|
| Inventive Example 1 | 3.5 | 5.2 | AF + B + M | 40 | 3.3 | 18.1 |
| Inventive Example 2 | 2.0 | 2.6 | AF + B | 53 | 6.2 | 11.2 |
| Inventive Example 3 | 2.9 | 3.8 | AF + B | 50 | 5.6 | 11.6 |
| Inventive Example 4 | 2.9 | 3.9 | AF + PF + B | 40 | 4.8 | 11.2 |
| Comparative Example 1 | 2.9 | 3.7 | AF + PF + B | 39 | 4.8 | 10.3 |
| Comparative Example 2 | 2.9 | 3.9 | AF + PF | 39 | 6.6 | 8.0 |
| Comparative Example 3 | 2.0 | 3.4 | B + M + RA | 37 | 8.4 | 7.5 |

AF: Acicular ferrite,
PF: Polygonal ferrite,
B: Bainite,
M: Martensite,
RA: Retained austenite
R = (K/G) × (Q/T)
Q = (I × E) × 0.048/u(I: Welding current (A), E: Welding voltage (V), u: Welding speed (cm/min))

TABLE 5

| No. | Maximum load (MPa) | Minimum load (MPa) | Inventive Example 1 | Inventive Example 2 | Inventive Example 3 | Inventive Exaple 4 | Comparative Example 1 | Comparative Example 2 | Comparative Example 3 |
|---|---|---|---|---|---|---|---|---|---|
| | | | | | Fatigue life (Cycles) | | | | |
| 1 | 240 | 24 | 98,430 | 118,790 | 102,638 | Not measured | Not measured | Not measured | Not measured |
| 2 | 220 | 22 | 123,528 | 155,943 | 137,269 | 72,109 | Not measured | Not measured | Not measured |
| 3 | 200 | 20 | 213,637 | 241,957 | 226,372 | 131,479 | Not measured | Not measured | Not measured |
| 4 | 180 | 18 | 357,832 | 473,419 | 382,836 | 169,252 | 107,392 | 84,738 | 147,392 |
| 5 | 170 | 17 | 824,365 | 2,000,000 | 2,000,000 | 231,985 | 162,498 | 126,647 | 212,637 |
| 6 | 160 | 16 | 2,000,000 | 2,000,000 | 2,000,000 | 294,719 | 217,603 | 158,603 | 276,423 |
| 7 | 140 | 14 | 2,000,000 | 2,000,000 | 2,000,000 | 2,000,000 | 327,626 | 252,512 | 537,246 |
| 8 | 120 | 12 | 2,000,000 | 2,000,000 | 2,000,000 | 2,000,000 | 694,714 | 361,843 | 2,000,000 |
| 9 | 110 | 11 | 2,000,000 | 2,000,000 | 2,000,000 | 2,000,000 | 2,000,000 | 853,274 | 2,000,000 |
| 10 | 100 | 10 | 2,000,000 | 2,000,000 | 2,000,000 | 2,000,000 | 2,000,00 | 2,000,000 | 2,000,000 |

TABLE 6

| Welding member No. | Measurement point | 1.0 mm | 2.0 mm | 3.0 mm | 4.0 mm | 5.0 mm |
|---|---|---|---|---|---|---|
| | | | | Residual stress (MPa) | | |
| Inventive Example1 | Bead start portion | −362.4 | −309.4 | −274.9 | −270.5 | −370.5 |
| | Bead center portion | −254.7 | −198.6 | −247.6 | −195.6 | −284.3 |
| | Bead end portion | −424.8 | −362.9 | −460.6 | −522.3 | −492.3 |
| Inventive Example2 | Bead start portion | −170.6 | −231.0 | −174.1 | −207.4 | −264.2 |
| | Bead center portion | −147.9 | −221.6 | −141.9 | −139.2 | −102.3 |
| | Bead end portion | −110.2 | −147.0 | −167.9 | −130.3 | −114.6 |

TABLE 6-continued

| Welding member No. | Measurement point | 1.0 mm | 2.0 mm | 3.0 mm | 4.0 mm | 5.0 mm |
|---|---|---|---|---|---|---|
| | | | | Residual stress (MPa) | | |
| Inventive Example3 | Bead start portion | −196.3 | −280.7 | −260.3 | −363.5 | −402.9 |
| | Bead center portion | −389.1 | −247.6 | −359.4 | −316.8 | −295.7 |
| | Bead end portion | −424.3 | −409.2 | −519.9 | −506.5 | −435.1 |
| Inventive Example4 | Bead start portion | −121.3 | −178.6 | −157.5 | −159.0 | −194.9 |
| | Bead center portion | −93.0 | −129.9 | −182.4 | −134.0 | −103.4 |
| | Bead end portion | −239.4 | −215.2 | −186.7 | −181.8 | −217.8 |

TABLE 6-continued

| Welding | | Residual stress (MPa) | | | | |
|---|---|---|---|---|---|---|
| member No. | Measurement point | 1.0 mm | 2.0 mm | 3.0 mm | 4.0 mm | 5.0 mm |
| Comparative Example1 | Bead start portion | 285.1 | 144.6 | 194.3 | 218.2 | 153.2 |
| | Bead center portion | 184.2 | 122.8 | 170.4 | 129.8 | 100.6 |
| | Bead end portion | 218.2 | 228.1 | 229.2 | 202.9 | 196.4 |
| Comparative Example2 | Bead start portion | 338.3 | 354.6 | 318.2 | 295.4 | 175.6 |
| | Bead center portion | 243.3 | 220.5 | 225.4 | 274.6 | 216.8 |
| | Bead end portion | 221.4 | 284.6 | 251.6 | 135.7 | 110.6 |
| Comparative Example3 | Bead start portion | −75.2 | −87.6 | −67.3 | −56.7 | −83.5 |
| | Bead center portion | −56.7 | −43.8 | −62.9 | −53.4 | −73.6 |
| | Bead end portion | −84.6 | −72.4 | −87.2 | −86.3 | −73.4 |

Figure 2:
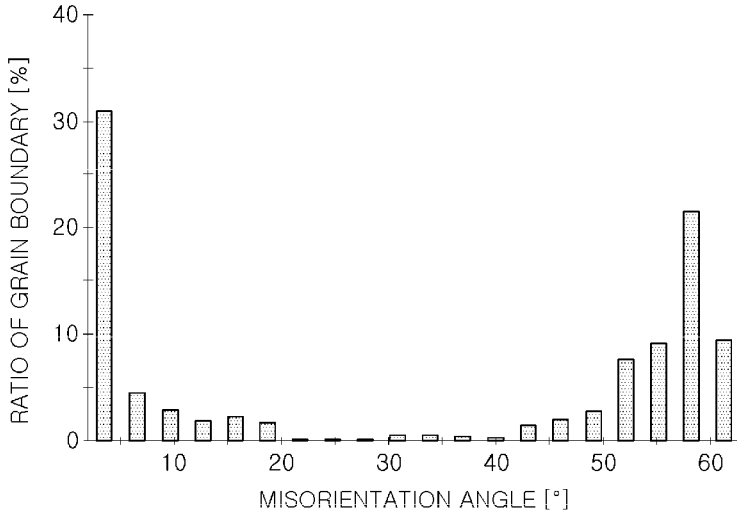
FIG. 2 is a graph of a ratio of a grain boundary according to a misorientation angle between grains of Inventive Example 1 according to an embodiment of the present disclosure.

FIG. 1 is a photograph of an image quality (IQ) and an inverse pole figure (IPF) of Inventive Example 1 observed with EBSD, and FIG. 2 is a graph of a ratio of a grain boundary according to a misorientation angle between grains of Inventive Example 1.

Figure 3:
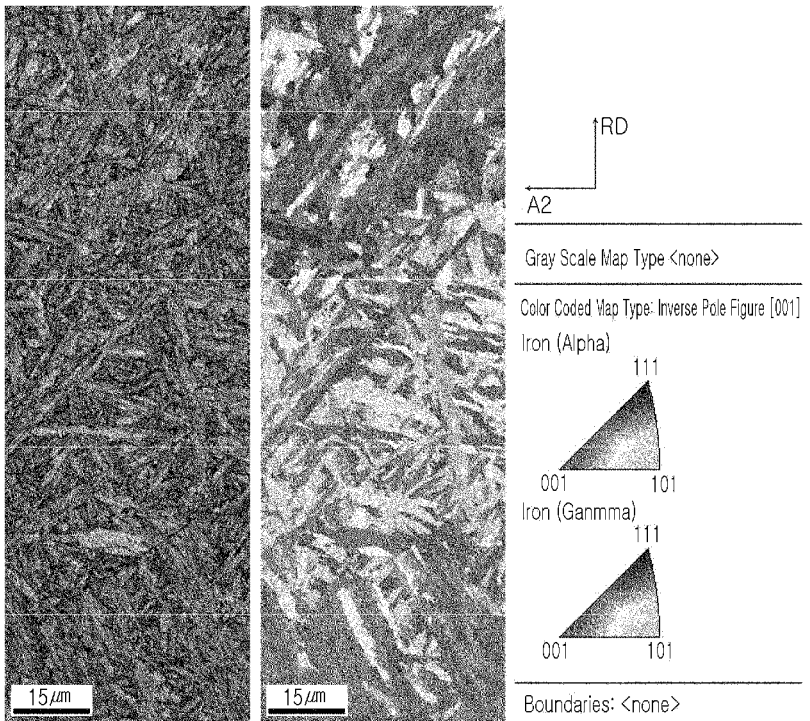
FIG. 3 is an image quality (IQ) and inverse pole figure (IPF) photograph of Inventive Example 2 according to an embodiment of the present disclosure observed with EBSD.
Figure 4:
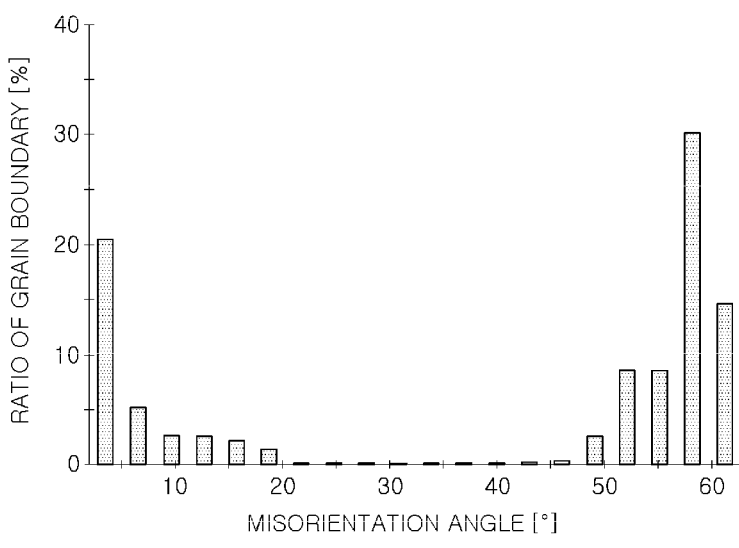
FIG. 4 is a graph of a ratio of a grain boundary according to a misorientation angle between grains of Inventive Example 2 according to an embodiment of the present disclosure.

FIG. 3 is a photograph of an image quality (IQ) and an inverse pole figure (IPF) of Inventive Example 2 observed with EBSD, and FIG. 4 is a graph of a ratio of a grain boundary according to a misorientation angle between grains of Inventive Example 2.

Figure 5:
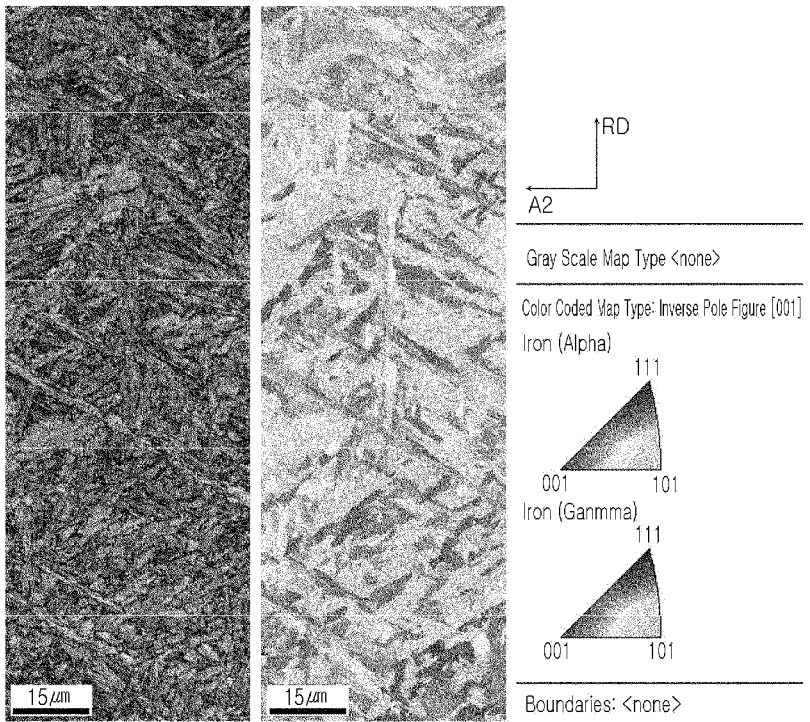
FIG. 5 is an image quality (IQ) and inverse pole figure (IPF) photograph of Inventive Example 3 according to an embodiment of the present disclosure observed with EBSD.
Figure 6:
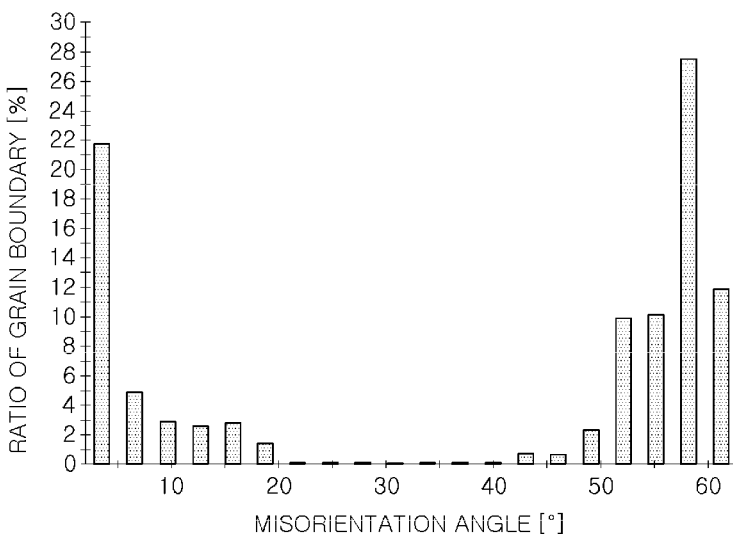
FIG. 6 is a graph of a ratio of a grain boundary according to a misorientation angle between grains of Inventive Example 3 according to an embodiment of the present disclosure.

FIG. 5 is a photograph of an image quality (IQ) and an inverse pole figure (IPF) of Inventive Example 3 observed with EBSD, and FIG. 6 is a graph of a ratio of a grain boundary according to a misorientation angle between grains of Inventive Example 3.

Figure 7:
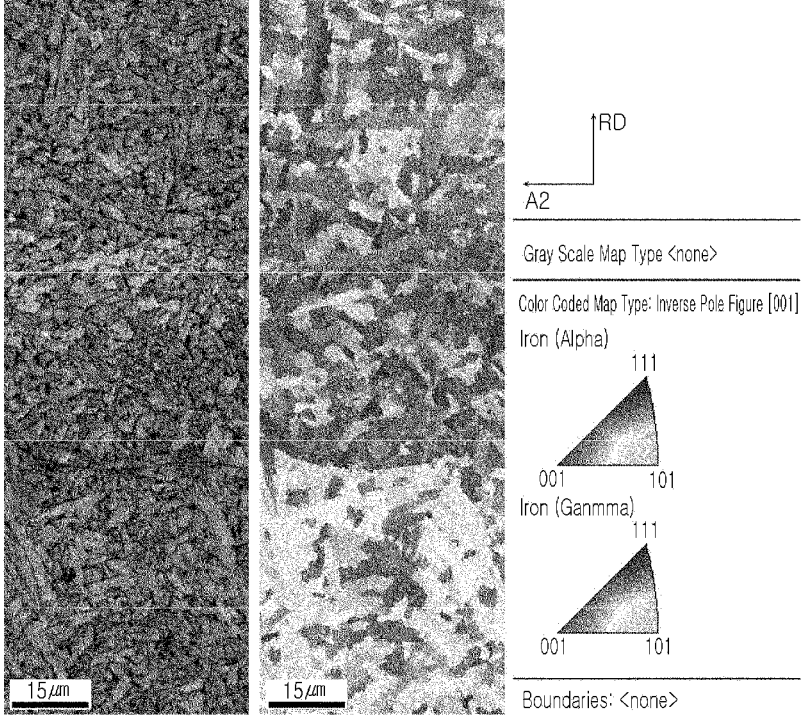
FIG. 7 is an image quality (IQ) and inverse pole figure (IPF) photograph of Inventive Example 4 according to an embodiment of the present disclosure observed with EBSD.
Figure 8:
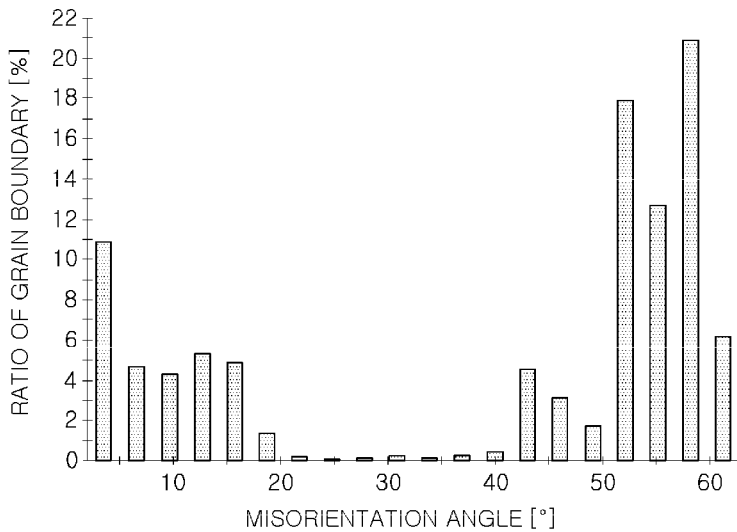
FIG. 8 is a graph of a ratio of a grain boundary according to a misorientation angle between grains of Inventive Example 4 according to an embodiment of the present disclosure.

FIG. 7 is a photograph of an image quality (IQ) and an inverse pole figure (IPF) of Inventive Example 4 observed with EBSD, and FIG. 8 is a graph of a ratio of a grain boundary according to a misorientation angle between grains of Inventive Example 4.

Figure 9:
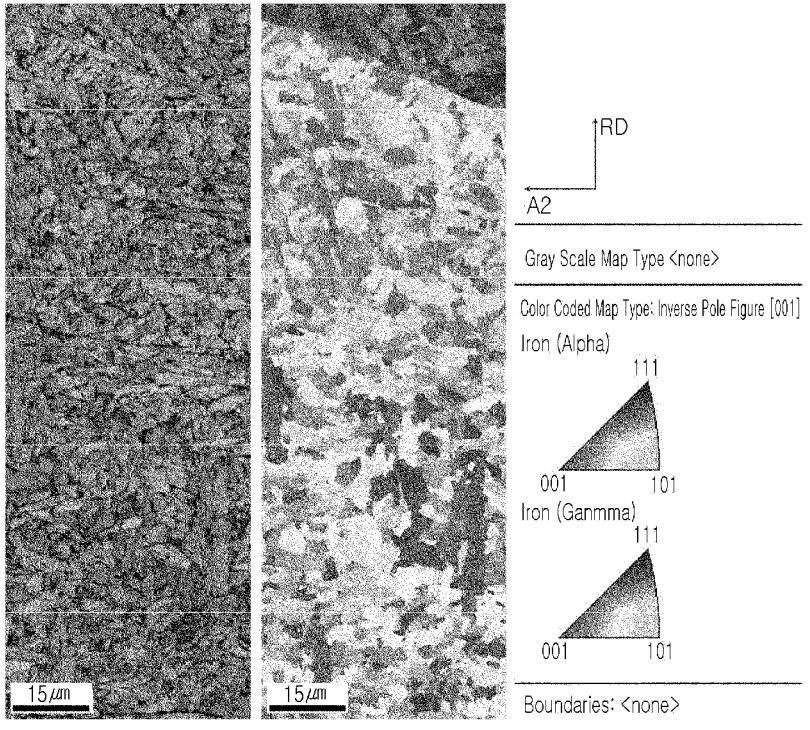
FIG. 9 is an image quality (IQ) and inverse pole figure (IPF) photograph of Inventive Example 4 according to an embodiment of the present disclosure observed with EBSD.
Figure 10:
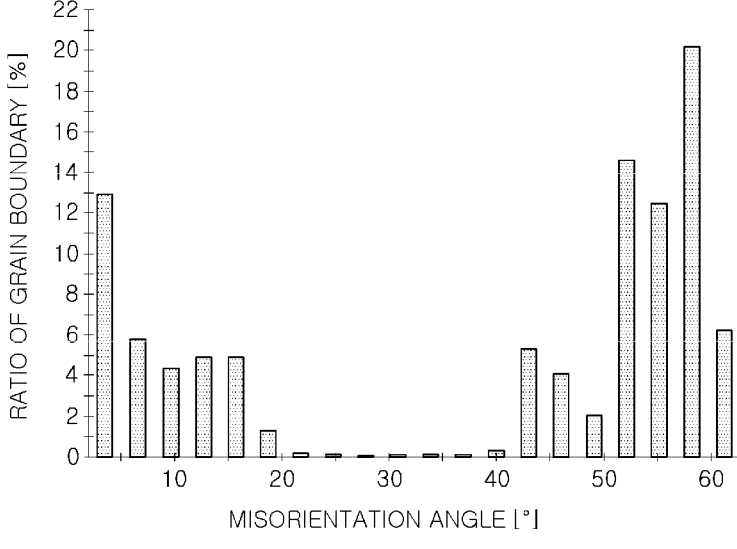
FIG. 10 is a graph of a ratio of a grain boundary according to a misorientation angle between grains of Comparative Example 1 according to an embodiment of the present disclosure.

FIG. 9 is a photograph of an image quality (IQ) and an inverse pole figure (IPF) of Comparative Example 1 observed with EBSD, and FIG. 10 is a graph of a ratio of a grain boundary according to a misorientation angle between grains of Comparative Example 1.

Figure 11:
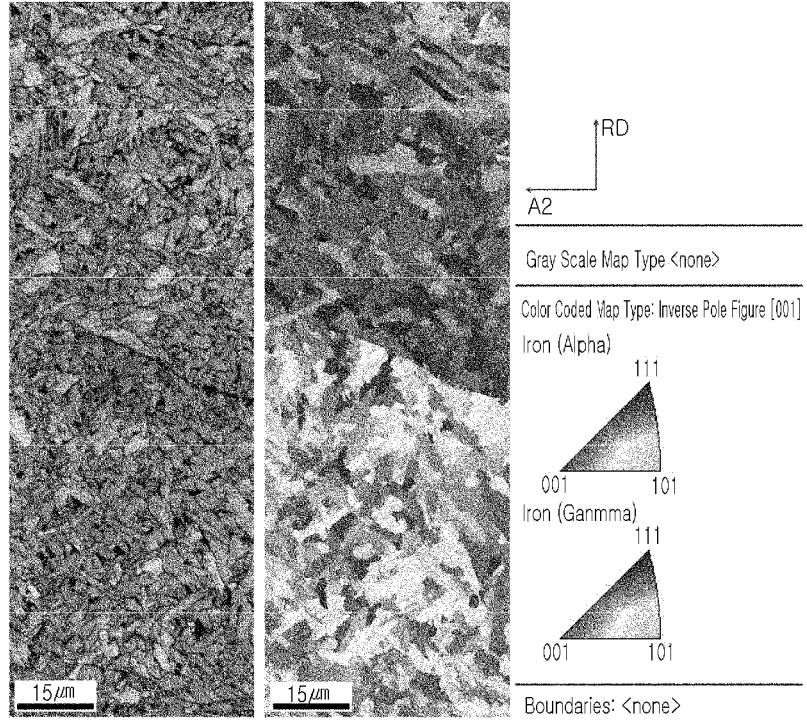
FIG. 11 is an image quality (IQ) and inverse pole figure (IPF) photograph of Comparative Example 2 according to an embodiment of the present disclosure observed with EBSD.
Figure 12:
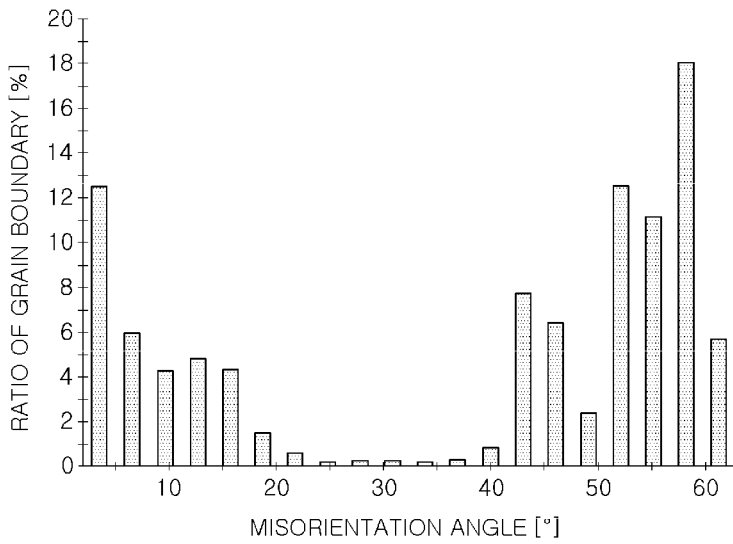
FIG. 12 is a graph of a ratio of a grain boundary according to a misorientation angle between grains of Comparative Example 2 according to an embodiment of the present disclosure.

FIG. 11 is a photograph of an image quality (IQ) and an inverse pole figure (IPF) of Comparative Example 2 observed with EBSD, and FIG. 12 is a graph of a ratio of a grain boundary according to a misorientation angle between grains of Comparative Example 2.

As can be seen from Tables 1 to 6 and FIGS. 1 to 12, in the case of Inventive Examples 1 to 4, it can be seen that excellent fatigue strength and compressive residual stress are secured as the conditions suggested by the present disclosure are satisfied. On the other hand, in the case of Comparative Examples 1 to 3, since the conditions suggested by the present disclosure are not satisfied, it can be seen that not only the fatigue strength is low, but also the tensile residual stress exists or compressive strength is at a low level.

While example embodiments have been shown and described above, it will be apparent to those skilled in the art that modifications and variations could be made without departing from the scope of the present disclosure as defined by the appended claims.

The invention claimed is:

1. A gas-shielded arc welding wire having fatigue resistance characteristics and resistance to deformation due to residual stress in a weld zone, comprising, by weight %,
0.06 to 0.16% of C, 0.001 to 0.2% of Si, 1.6 to 1.9% of Mn, 1.2 to 6.0% of Cr, 0.4 to 0.65% of Mo, 0.015% or less (excluding 0%) of P, 0.01% or less (excluding 0%) of S, 0.20% or less (excluding 0%) of Al, and a remainder of Fe and other impurities,
wherein a value in Equation 1 below is 300 to 500, $$732-202\times C+216\times Si-85\times Mn-37\times Ni-47\times Cr-39\times Mo \quad \text{[Equation 1]}$$

where, a content of each element in [Equation 1] is in wt %.

2. The gas-shielded arc welding wire having fatigue resistance characteristics and resistance to deformation due to residual stress in a weld zone of claim 1,
wherein the wire further comprises at least one of 0.40% or less of Ni and 0.50% or less of Cu.

3. The gas-shielded arc welding wire having fatigue resistance characteristics and resistance to deformation due to residual stress in a weld zone of claim 1,
wherein the wire is one of a solid wire, a metal-cored wire and flux-cored wire.

4. A welding member including a base material and a weld zone, the welding member having fatigue resistance characteristics and resistance to deformation due to residual stress in a weld zone,
wherein the weld zone comprises, by weight %, 0.05 to 0.16% of C, 0.001 to 1.0% of Si, 1.4 to 2.5% of Mn, 0.4 to 5.0% of Cr, 0.1 to 1.5% of Mo, 0.015% or less (excluding 0%) of P, 0.01% or less (excluding 0%) of S, 0.20% or less (excluding 0%) of Al, and a remainder of Fe and other impurities,
wherein the weld zone has a microstructure including bainite; acicular ferrite; and at least one of granular ferrite, martensite and retained austenite;
wherein the microstructure has an average effective grain size of 10 μm or less, and a ratio of high angle grain boundaries with a misorientation angle between grain boundaries of 55° or more respective to the total grain boundaries is 40% or more, and
a value of R expressed by the following Equation 2 is 10.5 to 18.5, $$R=(K/G)\times(Q/T) \text{ where, in [Equation 2],} \quad \text{[Equation 2]}$$

K is a ratio of grain boundaries with a misorientation angle of 55° or more relative to total grain boundaries in a weld zone (%), G is an average effective grain size of the weld zone (m), T is a thickness of a base material (mm), and Q is a welding heat input (kJ/cm), where Q is defined by the following [Equation 3]

$$Q=(I\times E)\times 0.048/v \quad \text{[Equation 3]}$$

where, in [Equation 3], I is a welding current (A), E is a welding voltage (V), and v is a welding speed (cm/min).

5. The welding member having fatigue resistance characteristics and resistance to deformation due to residual stress in a weld zone of claim 4, wherein the weld zone further comprises at least one of 0.40% or less of Ni and 0.50% or less of Cu.

6. The welding member having fatigue resistance characteristics and resistance to deformation due to residual stress in a weld zone of claim 4, wherein the weld zone has fatigue strength of 140 MPa or more.

7. The welding member having fatigue resistance characteristics and resistance to deformation due to residual stress in a weld zone of claim 4, wherein the weld zone has compressive residual stress of 90 MPa or more in a region within 5 mm from an end portion of a weld bead in a direction, perpendicular to a base material.

8. The welding member having fatigue resistance characteristics and resistance to deformation due to residual stress in a weld zone of claim 4, wherein the base material comprises, by weight %, 0.05 to 0.13% of C, 0.2 to 2.0% of Si, 1.3 to 3.0% of Mn, 0.01 to 2.0% of Cr, 0.01 to 2.0% of Mo, 0.01 to 0.1% of Al, 0.001 to 0.05% of P, 0.001 to 0.05% of S, and a remainder of Fe and other impurities.

9. The welding member having excellent fatigue resistance characteristics and resistance to deformation due to residual stress of a weld zone of claim 8, wherein the base material further comprises at least one of 0.01 to 0.2% of Ti and 0.01 to 0.1% of Nb.

10. The welding member having fatigue resistance and resistance to deformation due to residual stress of a weld zone of claim 4, wherein the base material has a thickness of 0.8 to 4.0 mm.

11. A method for manufacturing a welding member obtained by preparing two or more base materials, and then gas-shielded arc welding using a welding wire, the method for manufacturing a welding member having fatigue resistance characteristics and resistance to deformation due to residual stress of a weld zone, wherein the welding wire comprises, by weight %, 0.06 to 0.16% of C, 0.001 to 0.2% of Si, 1.6 to 1.9% of Mn, 1.2 to 6.0% of Cr, 0.4 to 0.65% of Mo, 0.015% or less (excluding 0%) of P, 0.01% or less (excluding 0%) of S, 0.20% or less (excluding 0%) of Al, and a remainder of Fe and other impurities, wherein a value of Equation 1 below is 300 to 500, wherein, during the gas-shielded arc welding, a value of Equation 4 below is 1.2 to 1.6, $$732-202\times C+216\times Si-85\times Mn-37\times Ni-47\times Cr-39\times Mo \quad \text{[Equation 1]}$$

where, in [Equation 1], a content of each element is in wt %

$$Q/T \quad \text{[Equation 4]}$$

where, in [Equation 4], T is a thickness of a base material (mm) and Q is a welding heat input (kJ/cm), where Q is defined by the following [Equation 3] [Equation 3] $Q=(I\times E)\times 0.048/o$ where, in [Equation 3], I is a welding current (A), E is a welding voltage (V), and v is a welding speed (cm/min), wherein the weld zone has a microstructure including bainite; acicular ferrite; and at least one of granular ferrite, martensite and retained austenite.

12. The method for manufacturing a welding member having fatigue resistance characteristics and resistance to deformation due to residual stress in a weld zone of claim 11, wherein the base material comprises, by wt %, 0.05 to 0.13% of C, 0.2 to 2.0% of Si, 1.3 to 3.0% of Mn, 0.01 to 2.0% of Cr, 0.01 to 2.0% of Mo, 0.01 to 0.1% of Al, 0.001 to 0.05% of P, 0.001 to 0.05% of S, and a remainder of Fe and other impurities.

13. The method for manufacturing a welding member having fatigue resistance characteristics and resistance to deformation due to residual stress of a weld zone of 12, wherein the base material further comprises at least one of 0.01 to 0.2% of Ti and 0.01 to 0.1% of Nb.

14. The method for manufacturing a welding member having fatigue resistance characteristics and resistance to deformation due to residual stress in a weld zone of claim 11, wherein the base material has a thickness of 0.8 to 4.0 mm.

*     *     *     *     *